June 4, 1940.  J. MACSICSKA  2,203,536
BRAKE EQUALIZER FOR AUTOMOBILES
Filed Aug. 26, 1939  4 Sheets-Sheet 1

INVENTOR
Julius Macsicska
BY
ATTORNEY

June 4, 1940.   J. MACSICSKA   2,203,536
BRAKE EQUALIZER FOR AUTOMOBILES
Filed Aug. 26, 1939   4 Sheets-Sheet 2

INVENTOR
Julius Macsicska
BY
ATTORNEY

June 4, 1940.   J. MACSICSKA   2,203,536
BRAKE EQUALIZER FOR AUTOMOBILES
Filed Aug. 26, 1939   4 Sheets-Sheet 3

INVENTOR
Julius Macsicska
BY
ATTORNEY

June 4, 1940.  J. MACSICSKA  2,203,536
BRAKE EQUALIZER FOR AUTOMOBILES
Filed Aug. 26, 1939  4 Sheets-Sheet 4

INVENTOR
*Julius Macsicska*
BY
*Zoltan H. Holacek*
ATTORNEY

Patented June 4, 1940

2,203,536

UNITED STATES PATENT OFFICE 2,203,536

BRAKE EQUALIZER FOR AUTOMOBILES

Julius Macsicska, New York, N. Y.

Application August 26, 1939, Serial No. 292,042

5 Claims. (Cl. 188—204)

This invention relates to new and useful improvements in a brake equalizer for automobiles.

The invention has for an object the construction of an equalizer adapted to equalize each of the brakes on the various wheels of an automobile.

More specifically the invention contemplates the use of several differentials associated with each other in a particular way to obtain the desired results.

The invention contemplates the use of a front differential actuated by the brake rod and provided with certain radial arms which in turn individually actuate rear differentials. It is proposed to so arrange the rear differentials that they individually control all of the brakes on all of the wheels of the automobile.

More specifically it is proposed to characterize each rear differential by the fact that it operates a tubular shaft and a solid shaft in each tubular shaft. It is proposed that each of these shafts be provided with an element for working a brake of the vehicle.

Still further the invention proposes a novel arrangement by which the relative positions of the various differentials may be changed so as to reset the differentials if they assume undesirable positions due to uneven wear on the brakes of the vehicle.

Still further the invention proposes the construction of a brake equalizer for automobiles as mentioned which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
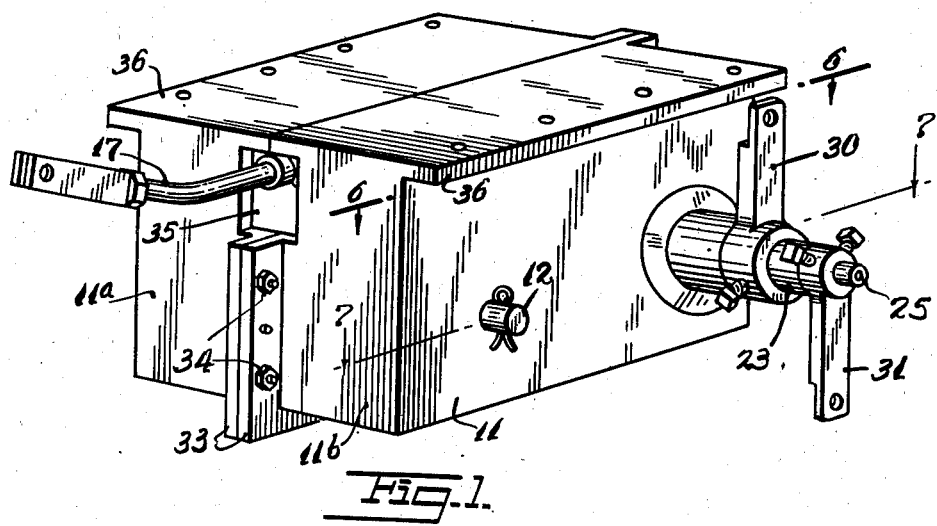
Fig. 1 is a perspective view of a brake equalizer for automobiles constructed in accordance with this invention.
Figure 2:
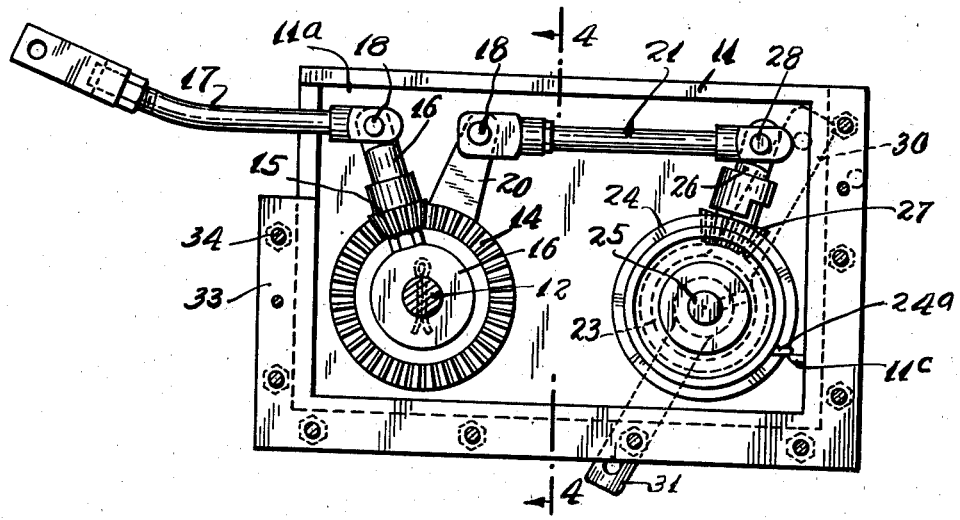
Fig. 2 is a side elevational view of the brake equalizer shown in Fig. 1 with one half of it removed.
Figure 3:
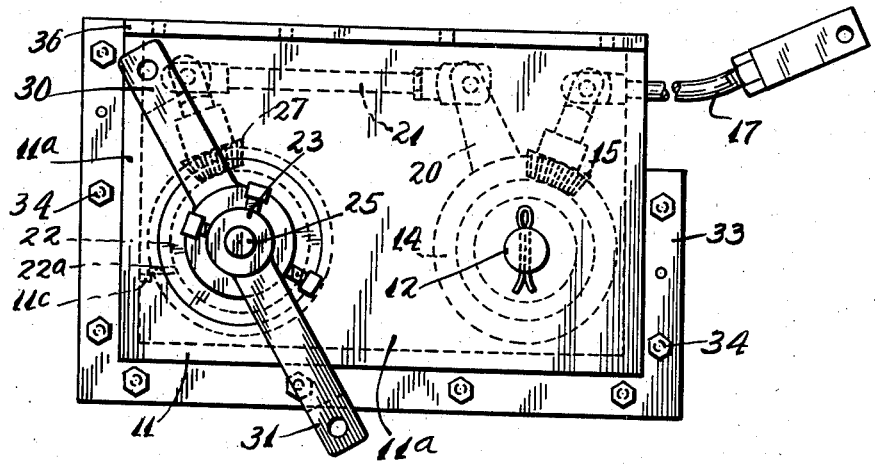
Fig. 3 is a rear elevational view of Fig. 1.
Figure 5:
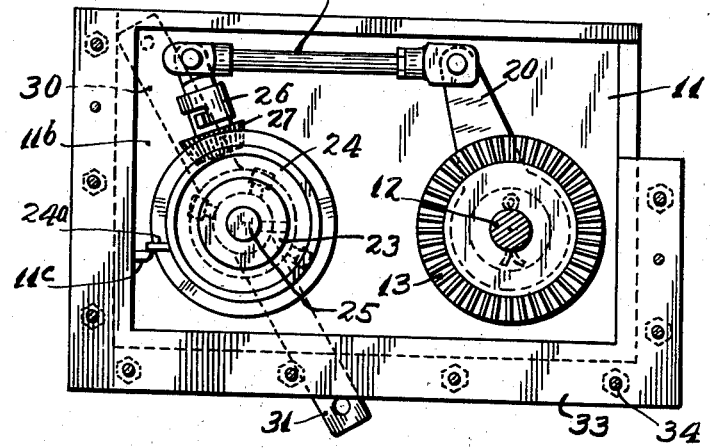
Fig. 5 is a longitudinal sectional view taken on the line 5—5 of Fig. 4.
Figure 4:
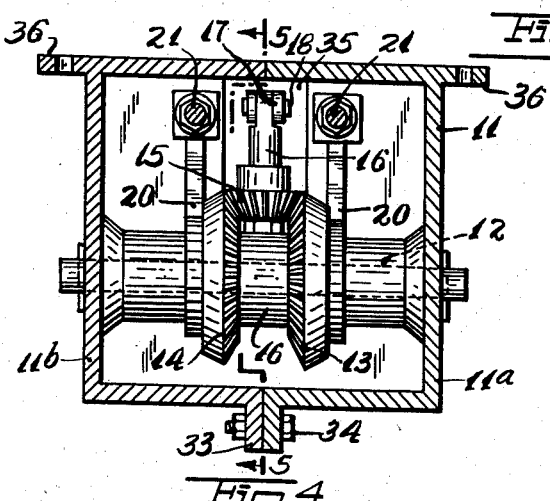
Fig. 4 is a transverse sectional view taken on the line 4—4 of Fig. 2.
Figure 7:
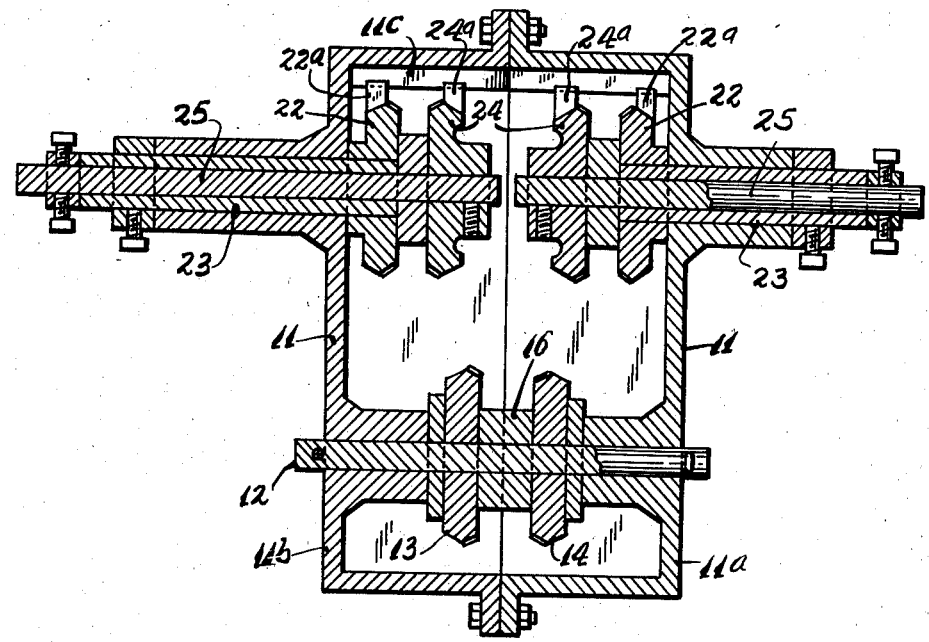
Fig. 7 is a horizontal view taken on the line 7—7 of Fig. 1.
Figure 6:
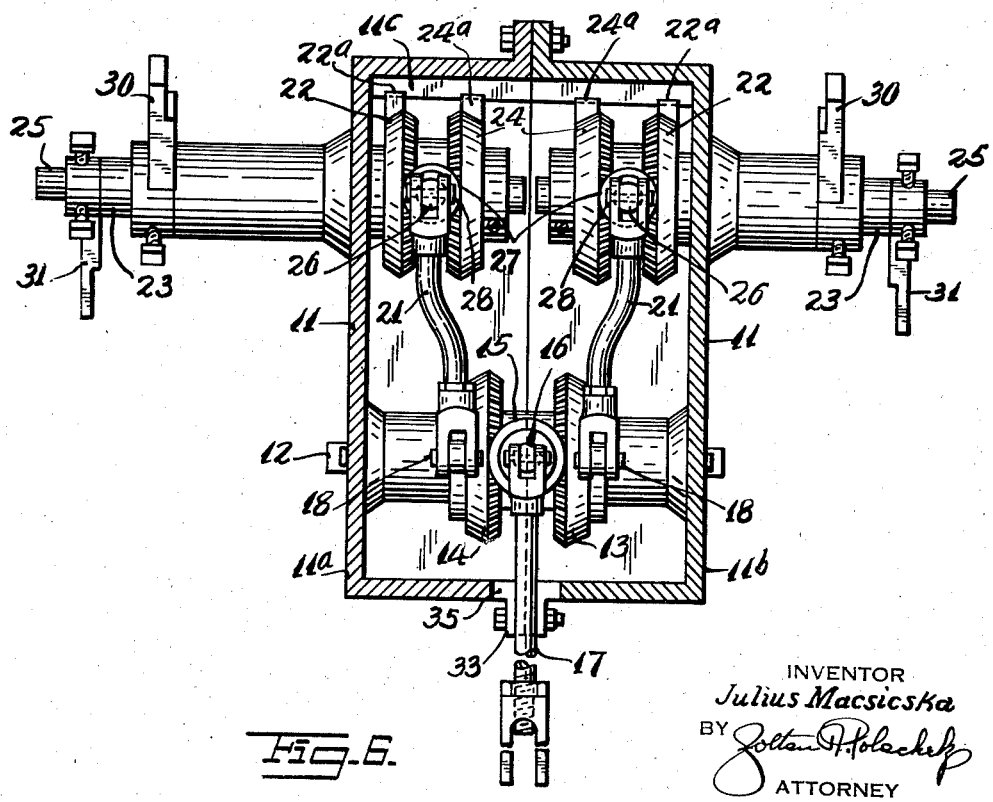
Fig. 6 is a horizontal sectional view taken on the line 6—6 of Fig. 1.

The brake equalizer for automobiles includes a hollow body 11. A main shaft 12 is turnably supported through the front end of the body 11. A front gear differential is mounted on the shaft 12 and consists of a pair of opposite bevel gears 13 and 14 rotatively mounted upon the shaft 12 and cooperative with a pinion 15 which is rotatively supported on a radial arm 16 turnably mounted upon the shaft 12. The pinion 15 meshes with the bevel gears 13 and 14. A brake rod 17 is pivotally connected by a pintle 18 with the extended end of the radial arm 16.

The brake rod 17 is intended to be connected with the foot brake of an automobile, or with the hand brake, as desired. The arrangement is such that when the brake pedal is depressed, the rod 17 will move forwards similarly moving the radial arm 16. As the radial arm 16 moves forwards the gear 15 will move correspondingly and cause the bevel gears 13 and 14 to turn together as a unit, if the resistance on them is equal, or to cause one to turn further than the other to equal an uneven resistance, as will hereinafter be more fully described.

A link supporting radial arm 20 is fixedly mounted upon the outer faces of each of the bevelled gears 13 and 14. A link 21 is connected with each of said link supporting radial arms 20. A rear differential is mounted on each side wall of the hollow body 11 and each of these differentials comprises a bevel gear 22 mounted on a tubular shaft 23 rotative through the side wall of the body 11. Each bevelled gear 22 is opposed to a bevel gear 24 which is mounted on a shaft 25 coaxially extending through the tubular shaft 23. A pinion supporting radial arm 26 is coaxially rotative with the latter mentioned shafts and disposed between the bevel gears 22 and 23 and rotatively supports a pinion 27 which meshes with the bevel gears 22 and 24. The said links 21 are pivotally connected by pintles 28 with the radial arms 26 of the rear differential.

Elements for working the brakes of the vehicle are connected with the extended ends of the tubular and inner shafts 23 and 25 respectively. These elements comprise a radial arm 30 fixedly mounted upon the extended end of each tubular shaft 23, and another radial arm 31 fixedly mounted on the extended end of each interior shaft 25. These radial arms 30 and 31 are adapted to be connected with the brakes of the vehicle.

The hollow body 11 is formed from two adjacent sections 11ª and 11ᵇ having flanges 33 on adjacent edges. These flanges are secured together by a plurality of bolts 34. The front wall of the body 11 is formed with an opening 35 through which the brake rod 17 passes. At the top the hollow body 11 is provided with flanges 36 by which it may be bolted to an underpart of an automobile. It is proposed that the radial arms 30 and 31 on one side of the body 11 be connected with the brakes at the front and at the rear on one side of the automobile, and that the radial arms 30 and 31 on the other side of the body be connected with the front and rear brakes on the other side of the automobile.

The operation of the device is as follows:

When the brake pedal 17 is pressed inwards the pinion 15 of the front gear differential will be moved forwards. This pinion 15 will rotate the bevel gears 13 and 14 equal if the four brakes on the vehicle have equal resistances. However if the brakes have unequalized resistances, one or the other of the gears 14 and 13 will rotate further than the other gear of this pair, depending upon where the least and most resistance occurs.

The turning of the gears 13 and 14 will be communicated to move the pinions 27 of the rear differentials. These pinions will be moved through different distances if the gears 13 and 14 turn through different distances. As each pinion 27 is moved forwards it will cause its bevel gears 22 and 24 to turn equal distances if the resistance is even, or unequal distance if the resistance is unequal. Thus one or the other of the shafts 23 and 25 will be turned through different distances if the resistances are different, and so equalize the braking action. Only when the resistances are equal will the various bevel gears of the different differentials turn in unison, and apply all of the four brakes with equal pressure.

Figure 8:
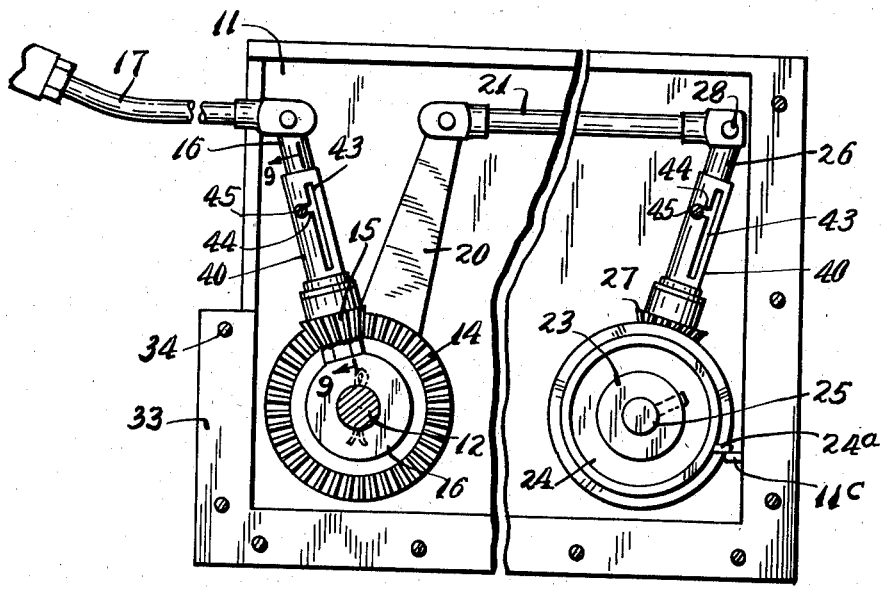
Fig. 8 is an elevational view similar to Fig. 2 but illustrating a modification of the invention.
Figure 9:
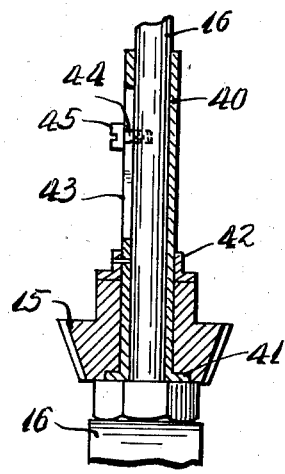
Fig. 9 is a fragmentary enlarged sectional view taken on the line 9—9 of Fig. 8.
Figure 10:
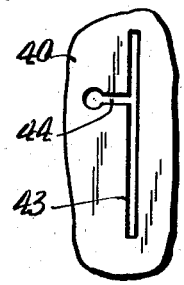
Fig. 10 is an enlarged detailed view of a portion of Fig. 8.

In Figs. 8 to 10 a modified form of the invention has been disclosed which distinguishes from the prior form in the fact that an arrangement has been provided whereby the pinion of each of the differentials may be readily disconnected from their associated bevel gears to permit the relative readjustment of the brake equalizer. More specifically each pinion is rotatively supported on a tubular member 40 releasably fixed on the radial arm of the differential.

Each tubular member 40 has a flange 41 at its bottom end engaging one end of the pinion, and a flange 42 spaced upwards and engaging the other end of the pinion. These flanges 40 and 41 limit the pinion to turning movements only. Each tubular member 40 is formed with a longitudinally extending slot 43 having a lateral branch 44 at one point. A set screw 45 is engaged through this lateral branch and threadedly engages into the material of the radial arm. When required the screw 45 may be loosened and then the tubular member 40 may be turned so that the longitudinally extending slot 43 is aligned with the screw 45. The tubular member 40 may now be moved upwards so as to move the pinion out of mesh with the bevel gears.

When the pinion is raised the bevel gears may be turned relative to each other so as to place the radial arms 16, 20 and 26 into desirable angular positions. In the new positions the parts may be relatively set by reengaging the pinions with the bevel gears. This is accomplished by the proper manipulation of the tubular member 40.

In other respects this form of the invention is identical to the prior form and the same parts may be recognized by the same reference numerals.

A rib 11ᶜ is provided on the inner portion of the casing which is adapted to be engaged by projections 22ª and 24ª of gears 22 and 24, respectively for aligning the device at the starting position.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A brake equalizer for automobiles, comprising a hollow body, a main shaft mounted through one end of said body, a front gear differential mounted on said shaft and consisting of a pair of opposite bevel gears on the shaft and a pinion rotative on a pinion supporting radial arm on said shaft and meshing with said bevel gears, a brake rod connecting with said radial arm for moving said pinion, a link supporting radial arm mounted on each of said bevel gears, a link connected with each of said link supporting radial arms, a rear differential mounted on each of the side walls of said hollow body and each comprising a bevel gear mounted on a tubular shaft rotative through the side wall, an opposed bevel gear on a shaft extending through said tubular shaft, and a pinion rotative on a pinion supporting radial arm, rotative coaxially with said latter shafts, and said pinion meshing with said opposed bevel gears, said links being pivotally connected with said latter named radial arm for moving said pinions of said differentials, and elements for working the brakes of a vehicle connected with the extended ends of said tubular and inner shafts.

2. A brake equalizer for automobiles, comprising a hollow body, a main shaft mounted through one end of said body, a front gear differential mounted on said shaft and consisting of a pair of opposite bevel gears on the shaft and a pinion rotative on a pinion supporting radial arm on said shaft and meshing with said bevel gears, a brake rod connecting with said radial arm for moving said pinion, a link supporting radial arm mounted on each of said bevel gears, a link connected with each of said link supporting radial arms, a rear differential mounted on each of the side walls of said hollow body and each comprising a bevel gear mounted on a tubular shaft rotative through the side wall, an opposed bevel gear on a shaft extending through said tubular shaft, and a pinion rotative on a pinion supporting radial arm, rotative coaxially with said latter shafts, and said pinion meshing with said opposed bevel gears, said links being pivotally connected with said latter named radial arms for moving said pinions of said differentials, and elements for working the brakes of a vehicle connected with the extended ends of said tubular and inner shafts, said hollow body being made of two longitudinal sections bolted together, said rear differentials being mounted upon the side walls of said sections.

3. A brake equalizer for automobiles, comprising a hollow body, a main shaft mounted through one end of said body, a front gear differential mounted on said shaft and consisting of a pair of opposite bevel gears on the shaft and a pinion rotative on a pinion supporting radial arm on said shaft and meshing with said bevel gears, a brake rod connecting with said radial arm for moving said pinion, a link supporting radial arm mounted on each of said bevel gears, a link connected with each of said link supporting radial arms, a rear differential mounted on each of the side walls of said hollow body and each comprising a bevel gear mounted on a tubular shaft rotative through the side wall, an opposed bevel gear on a shaft extending through said tubular shaft, and a pinion rotative on a pinion supporting radial arm, rotative coaxially with said latter shafts, and said pinion meshing with said opposed bevel gears, said links being pivotally connected with said latter named radial arms for moving said pinions of said differentials, elements for working the brakes of a vehicle connected with the extended ends of said tubular and inner shafts, and manually controlled means for movably supporting said pinions to slide upon said radial arms for disconnecting them from their bevel gears.

4. A brake equalizer for automobiles, comprising a hollow body, a main shaft mounted through one end of said body, a front gear differential mounted on said shaft and consisting of a pair of opposite bevel gears on the shaft and a pinion rotative on a pinion supporting radial arm on said shaft and meshing with said bevel gears, a brake rod connecting with said radial arm for moving said pinion, a link supporting radial arm mounted on each of said bevel gears, a link connected with each of said link supporting radial arms, a rear differential mounted on each of the side walls of said hollow body and each comprising a bevel gear mounted on a tubular shaft rotative through the side wall, an opposed bevel gear on a shaft extending through said tubular shaft, and a pinion rotative on a pinion supporting radial arm, rotative coaxially with said latter shafts, and said pinion meshing with said opposed bevel gears, said links being pivotally connected with said latter named radial arms for moving said pinions of said differentials, elements for working the brakes of a vehicle connected with the extended ends of said tubular and inner shafts, and manually controlled means for movably supporting said pinions to slide upon said radial arms for disconnecting them from their bevel gears, said means comprising a tubular member for each radial arm, each pinion being rotatively supported on one of said tubular members, and means for fixedly holding said tubular members on said radial arms.

5. A brake equalizer for automobiles, comprising a hollow body, a main shaft mounted through one end of said body, a front gear differential mounted on said shaft and consisting of a pair of opposite bevel gears on the shaft and a pinion rotative on a pinion supporting radial arm on said shaft and meshing with said bevel gears, a brake rod connecting with said radial arm for moving said pinion, a link supporting radial arm mounted on each of said bevel gears, a link connected with each of said link supporting radial arms, a rear differential mounted on each of the side walls of said hollow body and each comprising a bevel gear mounted on a tubular shaft rotative through the side wall, an opposed bevel gear on a shaft extending through said tubular shaft, and a pinion rotative on a pinion supporting radial arm, rotative coaxially with said latter shafts, and said pinion meshing with said opposed bevel gears, said links being pivotally connected with said latter named radial arms for moving said pinions of said differentials, elements for working the brakes of a vehicle connected with the extended ends of said tubular and inner shafts, and manually controlled means for movably supporting said pinions to slide upon said radial arms for disconnecting them from their bevel gears, said means comprising a tubular member for each radial arm, each pinion being rotatively supported on one of said tubular members, and means for fixedly holding said tubular members on said radial arms, including screws mounted upon said radial arms and engaging through slots formed in said tubular members, and each of said slots having an offset branch into which the screws may normally engage for fixedly holding the tubular members with the pinions engaging the bevel gears.

JULIUS MACSICSKA.